Sept. 4, 1962 A. M. THOMSEN 3,052,533
PROCESS FOR THE DIRECT REDUCTION OF IRON
Filed March 27, 1961
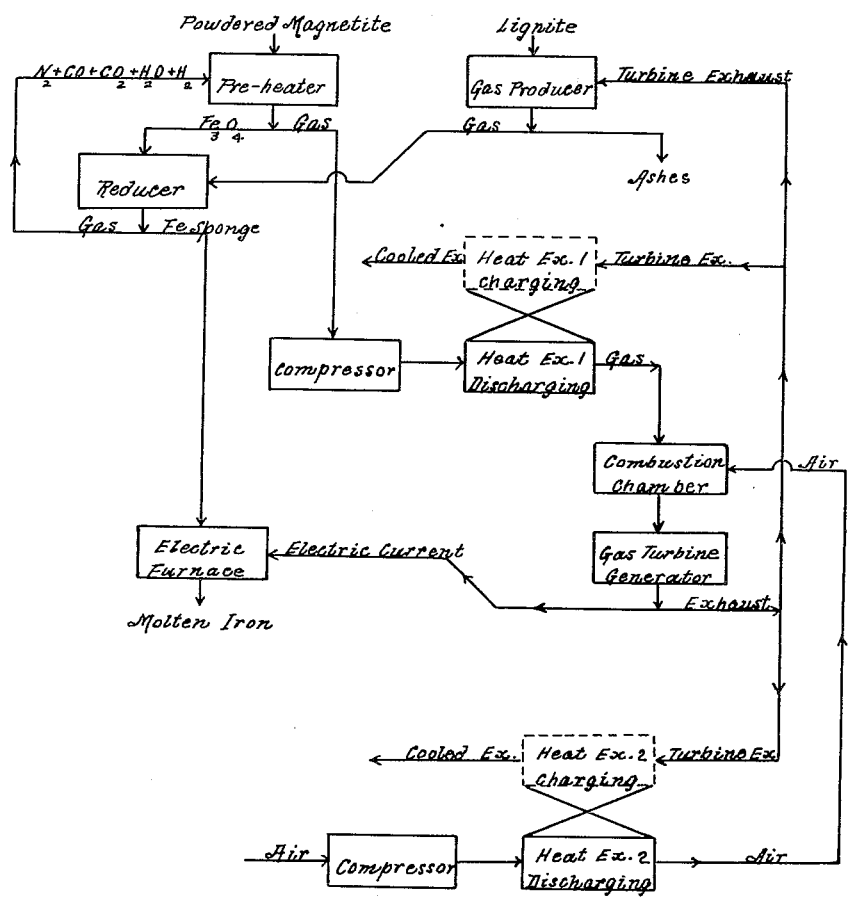
INVENTOR.
Alfred M. Thomsen.

United States Patent Office 3,052,533
Patented Sept. 4, 1962

3,052,533
PROCESS FOR THE DIRECT REDUCTION
OF IRON
Alfred M. Thomsen, 265 Buckingham Way, Apt. 402,
San Francisco, Calif.
Filed Mar. 27, 1961, Ser. No. 98,594
4 Claims. (Cl. 75—11)

The method of direct reduction of iron is today a well known subject. There are at least a dozen different versions, all patented, yet involving the same fundamental chemistry. It follows that all chemical reactions are well known and that said variants all use identical reactions but are diverse from one another in the technique involved. I, therefore, state at the start that I also use these reactions but that my technique is diverse and distinct from all that I know.

In my process I commence by making my reducing gaseous medium and after said medium has been used in the reduction of iron oxides to metal, which still must leave at least one-half of said reducing gases un-used, I use the gaseous mixture "as is" as the fuel of a gas turbine. Said turbine, in turn, produces the current needed to fuse the reduced iron, the so-called "sponge," and the heat resident in the exhaust gas from said turbine is then directly used in the gas-producer phase, and through heat exchange improves the over-all efficiency of the total assembly.

It will be seen that the production of the reducing gas, the use of said gas in reduction, which is only partial in so far as the use of the gas is concerned, and its final use in a gas turbine constitutes a complex rendered still more complete by the re-cycling of a portion of said turbine exhaust back to the gas-making phase. Manifestly, no portion of said complex can be omitted without making the entire proposal inoperative.

My process is best understood by following the sequence of the operations as set forth in the drawing which is attached hereto and made a part hereof. It will now be fully explained. In the upper right hand corner I show a conventional gas producer serviced by lignite as fuel. Of course, I do not limit myself to this fuel. Any compound of carbon and hydrogen, be it coal, wood, or oil can be substituted. Likewise, peat, any type, or natural gas can be substituted. It may seem that the latter, being already a gas, is self-excluded but such is not the case. Natural gas, being chiefly methane, is not an acceptable reducing gas in iron metallurgy. It must first be converted to a mixture of hydrogen and carbon monoxide by "reforming" or by limited oxidation. Such a conversion takes place in the gas-producer before mentioned.

I then show this gas, as is, advanced to the "reducer" which is operated preferentially between 1300° F. and 1500° F., and may be simply a conventional multiple-hearth furnace so well known in ore roasting. It is axiomatic that less than one-half of both the hydrogen and the carbon monoxide in the gas can be used in said reduction. There is but little loss in temperature during said reduction. The gas is essentially a mixture of carbon monoxide and nitrogen with but little hydrogen. The reaction between iron oxide and the latter is slightly endothermic, but to compensate, the former is exothermic.

The temperature brackets indicated for the reducer are but introductory. It will vary with the type of iron oxide used and its origin. The drawing specifies magnetite, but as there are many other kinds of iron ore in commercial usage, and all magnetite is not alike, depending upon the origin, so much latitude must be allowed. The temperature must be high enough to prevent carbon deposition through the catalytic action of iron oxides upon carbon monoxide according to the reaction $2CO = CO_2 + C$. Likewise, said temperature must be low enough to prevent incipient sintering of the charge. The temperatures given, must, therefore, be altered according to the physical behavior of the reacting substances. Obviously, the temperature of the gas leaving the producer should be at or near the temperature of the "reducer." All other matters being satisfactory it is self-evident that the higher the temperature the faster the entire operation becomes, hence a higher output for the same investment of capital.

In view of the high temperature of the gas leaving the reducer I have shown it being used to pre-heat the incoming magnetite in the "pre-heater" placed just above said reducer. In addition to the gas leaving the reducer I have also shown "Fe Sponge" as the reduced iron ore is generally called. If an exceedingly high grade of ore were used then the reduced iron would become "molding powder" and would be used without melting. As such ore is rare indeed most sponge must be melted. In this case I have shown the preferred use of the electric furnace placed just below the reducer. The final result of the operation will thus become molten iron or as it is often called "mild steel." As the magnetite must be powdered, 100 mesh being a preferred size, another multiple hearth furnace constitutes a suitable device for pre-heating.

The gas leaving the preheater is, of course, partially cooled by contact with the magnetite. It is next represented as going to the compressor, then through "heat exchanger 1" and on to the combustion chamber of the turbine. While not represented on the drawing it is essential that said gas be fully cooled and freed from ore dust before it enters such a device as a compressor. Such cooling and cleaning is conventionally effected by a water wash.

In said combustion chamber the gas encounters combustion air which is seen to emanate from the last line of the drawing. Air enters a compressor and is then heated by passage through "heat ex. 2" and then goes to the combustion chamber. Said heat exchangers are shown as drawing their heat from the turbine exhaust gases. This is on the accumulator principle. Heat is stored in the packing of said exchangers and then, on reversal of flow, said stored heat is communicated to the entering gas which it is desired to heat. Such use is entirely conventional and is illustrated by the "heat regenerators" of the open hearth steel furnace or the most modern form of the regenerators used in the making of "tonnage oxygen."

I have shown this on the drawing by using dotted outlines on the charging phase of said accumulators and by linking same with the discharging phase by an "X-bridge," indicating that they are parts of one device in alternate use. That portion of the turbine exhaust not thus used is indicated as going to the gas producer. It is obvious to any one familiar with a gas turbine that said exhaust is chiefly nitrogen and oxygen, only a relatively small portion of the oxygen in the air being consumed. Were it otherwise, then the turbine would speedily reach destructive temperatures.

The turbine exhaust thus acts as "air of combustion" for the gas producer while the carbon dioxide and water vapor present therein act to modify the temperature within said producer in the identical manner that steam is conventionally used so as to prevent fusion of the ash.

I claim:
1. The method of reducing an iron oxide to metallic iron which comprises: commingling said iron oxide with a reducing gaseous medium, consisting essentially of hydrogen, carbon monoxide and nitrogen, formed in a gas-producer operation from fuel, and the exhaust gas of a gas turbine, at non-sintering temperatures until said iron oxide shall have been substantially converted to metallic iron; burning the resultant partially spent reducing gas, consisting of un-reacted hydrogen and carbon monoxide, nitrogen, carbon dioxide, and water vapor, together with additive air in the conventional manner in the combustion space of a gas turbine and re-cycling a part of the exhaust gas of said gas turbine to the gas-producer phase of the operation as above specified.

2. The method of making metallic iron from iron oxide set forth in claim 1, with the added step that the unfused metallic iron produced therein be subjected to further heat generated by converting the mechanical energy of the gas turbine into electrical energy and using said electrical energy to raise the reduced metallic iron to a temperature above the fusion point of said iron.

3. The method of making fused metallic iron from iron oxide set forth in claim 2, with the added step that a portion of the exhaust gases from the turbine be used to preheat the air of combustion for said turbine before its entrance into the combustion space, said heating being effected by storing heat resident in said exhaust gases in a heat accumulator and subsequently conveying heat thus stored to the air of combustion, after compression, by reversal of flow of the gases involved.

4. The method of making fused metallic iron from iron oxide set forth in claim 2, with the added step that a portion of the exhaust gases from the turbine be used to preheat the gas used as fuel in said turbine, after compression and before entrance into the combustion space of said turbine, said heating being effected by storing heat resident in said exhaust gases in a heat accumulator and subsequently conveying heat thus stored to the fuel gas by reversal of flow of the gases involved.

References Cited in the file of this patent

UNITED STATES PATENTS

| | | |
|---|---|---|
| 2,107,549 | Schmalfeldt | Feb. 8, 1938 |
| 2,142,100 | Avery | Jan. 3, 1939 |
| 2,292,305 | Thomsen | Aug. 4, 1942 |
| 2,547,685 | Brassert et al. | Apr. 3, 1951 |
| 2,653,088 | Pike | Sept. 22, 1953 |